United States Patent
Seo et al.

(10) Patent No.: US 9,487,685 B2
(45) Date of Patent: Nov. 8, 2016

(54) ADHESIVE FOR POLARIZING PLATE AND POLARIZING PLATE INCLUDING THE SAME

(71) Applicant: LG CHEM, LTD., Seoul (KR)

(72) Inventors: Eun-Mi Seo, Daejeon-si (KR);
Eun-Soo Huh, Daejeon-si (KR);
Nam-Jeong Lee, Daejeon-si (KR);
Hwa-Sub Shim, Daejeon-si (KR);
Kyun-Il Rah, Daejeon-si (KR);
Jun-Wuk Park, Daejeon-si (KR);
Jee-Hyon Min, Gyeonggi-do (KR);
Yi-Rang Lim, Daejeon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/824,199

(22) PCT Filed: Oct. 12, 2012

(86) PCT No.: PCT/KR2012/008333
§ 371 (c)(1),
(2) Date: Mar. 15, 2013

(87) PCT Pub. No.: WO2013/055158
PCT Pub. Date: Apr. 18, 2013

(65) Prior Publication Data
US 2014/0072731 A1   Mar. 13, 2014

(30) Foreign Application Priority Data

Oct. 14, 2011  (KR) .................. 10-2011-0105505
Dec. 28, 2011  (KR) .................. 10-2011-0145112
Jun. 29, 2012  (KR) .................. 10-2012-0070904
Oct. 12, 2012  (KR) .................. 10-2012-0113305

(51) Int. Cl.
*C09J 163/00* (2006.01)
*C09J 163/10* (2006.01)
(Continued)

(52) U.S. Cl.
CPC ............ *C09J 163/00* (2013.01); *C08G 59/226* (2013.01); *C08G 59/68* (2013.01); *C08G 65/20* (2013.01); *C09J 163/10* (2013.01); *G02F 1/0107* (2013.01); *B32B 2457/20* (2013.01); *B32B 2457/202* (2013.01); *C08L 2205/02* (2013.01); *G02B 5/3033* (2013.01); *Y10T 428/1073* (2015.01); *Y10T 428/31515* (2015.04)

(58) Field of Classification Search
CPC ................... G02F 1/13345; G02F 2001/1536; G02F 2001/1533; G02F 2202/28; G02F 2201/50; G02F 1/0107; G02B 1/10; G02B 1/105; G02B 5/3033; B32B 17/10715; B32B 17/10733; B32B 27/00; B32B 27/06; B32B 27/08; B32B 27/16; B32B 27/18; B32B 27/28; B32B 27/285; B32B 27/30; B32B 27/308; B32B 27/38; B32B 2457/20; B32B 2457/202; C09J 7/00; C09J 4/00; C09J 4/06; C09J 163/00; C09J 163/04; C09J 163/06; C09J 163/08; C09J 163/10; C09J 2201/12; C09J 2201/122; C09J 2201/128; C09J 2201/134; C09J 2201/16; C09J 2201/162; C09J 2201/36; C09J 2201/40; C09J 9/02; C09J 11/00; C09J 11/02; C09J 11/04; C09J 11/08; C09J 2203/30; C09J 2203/318; C09J 113/00; C09J 153/00; C09J 153/005; C09J 153/02; C09J 153/025; C09J 171/00; C09J 171/02; C09J 171/08; C09J 171/10; C09J 171/12; B05D 5/10; C08G 65/20; C08G 59/68; C08G 59/226; Y10T 428/31515; Y10T 428/1073; C08L 2205/02
USPC ........ 428/1.1, 1.3, 1.31, 1.5, 1.53, 1.6, 1.61, 428/355 R, 355 EP, 355 EN, 355 AC; 156/60, 156/99, 106, 242, 246, 247, 249, 272.2, 156/273.7, 275.5, 275.7, 306.3, 325, 326, 156/330, 331.1; 349/96–103, 122, 138; 427/162, 163.1, 207.1, 208, 208.2, 427/208.4, 208.6, 208.8
See application file for complete search history.

(56) References Cited

U.S. PATENT DOCUMENTS 5,148,309 A   9/1992  Yamada et al.
5,738,918 A   4/1998  Shen et al.
(Continued)

FOREIGN PATENT DOCUMENTS

CN   101236269 A   8/2008
CN   101636672 A   1/2010
(Continued)

OTHER PUBLICATIONS

JP 2010229392 A, Sakamoto et al, English Machine Translation provided by http://dossier1.ipdl.inpit.go.jp/AIPN/odse_top_dn.ipdl?N0000=7400.*

(Continued)

*Primary Examiner* — Gwendolyn Blackwell
*Assistant Examiner* — Eli D Strah
(74) *Attorney, Agent, or Firm* — Dentons US LLP

(57) ABSTRACT

The present invention relates to an adhesive composition including 100 parts by weight of a first epoxy compound having a glass transition temperature of a homopolymer of not less than 120° C., 30 parts by weight to 100 parts by weight of a second epoxy compound having a glass transition temperature of a homopolymer of not more than 60° C., and 0.5 parts by weight to 20 parts by weight of a cationic photopolymerization initiator, and a polarizing plate using the same.

12 Claims, No Drawings

(51) Int. Cl.
*G02F 1/01* (2006.01)
*C08G 59/22* (2006.01)
*C08G 59/68* (2006.01)
*C08G 65/20* (2006.01)
*G02B 5/30* (2006.01)

(56) References Cited

U.S. PATENT DOCUMENTS

| | | | |
|---|---|---|---|
| 6,995,193 B1 * | 2/2006 | Fukui | 522/102 |
| 7,910,656 B2 | 3/2011 | Lutz et al. | |
| 8,184,370 B2 | 5/2012 | Yaegashi et al. | |
| 8,344,083 B2 | 1/2013 | Um et al. | |
| 8,722,182 B2 | 5/2014 | Akari et al. | |
| 8,968,862 B2 | 3/2015 | Seo et al. | |
| 2002/0074086 A1 | 6/2002 | Nakamura et al. | |
| 2003/0004278 A1 | 1/2003 | Asano et al. | |
| 2003/0071938 A1 | 4/2003 | Hamamoto et al. | |
| 2006/0093846 A1 | 5/2006 | Chien et al. | |
| 2006/0152640 A1 | 7/2006 | Tanabe et al. | |
| 2007/0087123 A1 | 4/2007 | Weber et al. | |
| 2008/0108721 A1 | 5/2008 | Ha et al. | |
| 2008/0112048 A1 | 5/2008 | Katou et al. | |
| 2008/0152837 A1 | 6/2008 | Chien et al. | |
| 2009/0040443 A1 | 2/2009 | Hada et al. | |
| 2009/0115945 A1 | 5/2009 | Inokuchi et al. | |
| 2009/0312515 A1 | 12/2009 | Uchida et al. | |
| 2010/0026939 A1 | 2/2010 | Shibuta et al. | |
| 2011/0117296 A1 | 5/2011 | Jang et al. | |
| 2011/0157525 A1 | 6/2011 | Yamasaki et al. | |
| 2011/0195249 A1 | 8/2011 | Song et al. | |
| 2011/0268874 A1 | 11/2011 | Yajima | |
| 2012/0019888 A1 * | 1/2012 | Mori et al. | 359/241 |
| 2013/0177719 A1 * | 7/2013 | Tasaka et al. | 428/32.26 |

FOREIGN PATENT DOCUMENTS

| | | | |
|---|---|---|---|
| CN | 101824296 A | 9/2010 | |
| CN | 101845286 A | 9/2010 | |
| CN | 101910890 A | 12/2010 | |
| CN | 102112899 A | 6/2011 | |
| CN | 102197101 A | 9/2011 | |
| EP | 2468835 A1 * | 6/2012 | C09J 163/00 |
| JP | 2000230016 A | 8/2000 | |
| JP | 2001151814 A | 6/2001 | |
| JP | 2002120326 A | 4/2002 | |
| JP | 2007-169172 A | 7/2007 | |
| JP | 2008-134384 A | 6/2008 | |
| JP | 2008-241946 A | 10/2008 | |
| JP | 2008-257199 A | 10/2008 | |
| JP | 2009-227804 A | 10/2009 | |
| JP | 2010-055062 A | 3/2010 | |
| JP | 2010-102214 A | 5/2010 | |
| JP | 2010-102310 A | 5/2010 | |
| JP | 2010102214 A | 5/2010 | |
| JP | 2010-209126 A | 9/2010 | |
| JP | 2010-229392 A | 10/2010 | |
| JP | 2010229392 A * | 10/2010 | C09J 171/00 |
| JP | 2010-277063 A | 12/2010 | |
| JP | 2011017820 A * | 1/2011 | G02B 5/30 |
| JP | 2011-039362 A | 2/2011 | |
| JP | 2011-170339 A | 9/2011 | |
| JP | 2011170339 A * | 9/2011 | G02B 5/30 |
| JP | 2011236389 A * | 11/2011 | C09J 163/00 |
| JP | 2012-208246 A | 10/2012 | |
| KR | 10-2002-0030852 | 4/2002 | |
| KR | 10-2007-0021152 | 2/2007 | |
| KR | 10-0773634 | 11/2007 | |
| KR | 10-2009-0043441 | 5/2009 | |
| KR | 20090115040 A | 11/2009 | |
| KR | 10-2010-0014583 | 2/2010 | |
| KR | 20100068178 A | 6/2010 | |
| KR | 20100100602 A | 9/2010 | |
| KR | 20100117591 A | 11/2010 | |
| KR | 10-1010574 | 1/2011 | |
| KR | 10-2011-0112217 | 10/2011 | |
| KR | 10-1072371 | 10/2011 | |
| WO | 2008/111584 | 9/2008 | |
| WO | WO 2008/111584 A1 * | 9/2008 | G02B 5/30 |
| WO | 2010/047386 A1 | 4/2010 | |
| WO | WO 2010119755 A1 * | 10/2010 | C09D 175/04 |
| WO | 2011/013663 A1 | 2/2011 | |
| WO | WO 2011021441 A1 * | 2/2011 | C09J 163/00 |
| WO | WO 2012042665 A1 * | 4/2012 | C09J 163/00 |
| WO | 2012-144260 A1 | 10/2012 | |

OTHER PUBLICATIONS

JP 2011017820 A, Iwata et al, English Machine Translation provided by http://dossier1.ipdl.inpit.go.jp/AIPN/odse_top_dn.ipdl?N0000=7400.*

JP 2011170339 A, Yajima et al, English Machine Translation provided by http://dossier1.ipdl.inpit.go.jp/AIPN/odse_top_dn.ipdl?N0000=7400.*

JP 2011236389 A, Okamoto et al, English Machine Translation provided by http://dossier1.ipdl.inpit.go.jp/AIPN/odse_top_dn.ipdl?N0000=7400.*

"Epoxy" definition, Dictionary.com, Apr. 2015.*

* cited by examiner

ADHESIVE FOR POLARIZING PLATE AND POLARIZING PLATE INCLUDING THE SAME

This application is a National Stage Entry of International Application No. PCT/KR2012/008333, filed Oct. 12, 2012, and claims the benefit of Korean Application Nos. 10-2011-0105505, filed on Oct. 14, 2011, 10-2011-0145112, filed on Dec. 28, 2011, 10-2012-0070904, filed on Jun. 29, 2012, and 10-2012-0113305, filed on Oct. 12, 2012, all of which are hereby incorporated by reference in its entirety for all purposes as if fully set forth herein.

TECHNICAL FIELD

The present invention relates to an adhesive for a polarizing plate, used for attaching a protective film or a compensation film to the polarizing plate, and a polarizing plate using the same, and more particularly, to a non-water-based adhesive for a polarizing plate having superior adhesive force, water resistance, and heat resistance, and a polarizing plate including the same.

BACKGROUND ART

In recent years, a liquid crystal display has been widely used in various display devices owing to characteristics thereof, such as low power consumption, low voltage operation, lightweightedness, and slimness. A liquid crystal display may include many elements, such as a liquid crystal cell, a polarizing plate, a phase difference film, a prism sheet, a diffusion film, a light guide plate, a light reflection sheet, etc. To this end, by decreasing the number of films used or making the films or sheets thin, improvements targeted at enhancements in productivity, lightweightedness and brightness are actively being undertaken.

The polarizing plate includes a polarizer made of a polyvinyl alcohol (PVA) resin dyed with dichroic dye or iodine, and a protective film stacked on one surface or both surfaces of the polarizer with an adhesive provided therebetween. Until recently, a triacetyl cellulose (TAC) film has been widely used as the protective film. However, the TAC film has a drawback in that it may be deformed in a high temperature and high humidity environment. Therefore, in recent years, protective films made of various materials capable of replacing the TAC film have been developed, and, for example, the use of polyethylene terephthalate (PET), a cycloolefin polymer (COP), an acrylic film alone or mixtures thereof, has been proposed.

Meanwhile, examples of adhesives that may be used for attaching the polarizer and the protective film to each other include an acrylic adhesive, a dry laminated adhesive made by mixing a urethane resin solution and a polyisocyanate resin solution, a styrene/butadiene/rubber adhesive, an epoxy adhesive, a polyvinyl alcohol adhesive, a urethane adhesive, an adhesive containing a compound having a polyester ionomer-type urethane resin and a glycidyl group, a thermosetting adhesive, or the like, while water-based adhesives made of an aqueous solution of polyvinyl alcohol resin may chiefly be used.

However, in the case of the water-based adhesives, when an acrylic film or a COP film is used as the protective film instead of the TAC film, the adhesive force of the protective film is weak, and thus, the protective film has a drawback in that use thereof is limited according to the material of the protective film. Also, in the case of water-based adhesives, in addition to adhesive failure due to the material, when the protective films applied to both surfaces of a PVA base film are made of different materials, curling of the polarizing plate may occur in the course of a drying process of the water-based adhesives and lowering of initial optical properties may be caused. As an alternative to solve these drawbacks, a non-water-based adhesive has been proposed.

However, since non-water-based adhesives generally have a high viscosity, a final adhesive layer shows a relatively thick tendency, compared with that in water-based adhesives. If the thickness of the adhesive layer is increased, a failure, such as curling occurs in a TD direction and an MD direction. Thus, it is preferable to reduce the thickness of the adhesive layer.

Therefore, in order to minimize the viscosity of the adhesive layer, a method of adding a hydrophilic monomer to a non-water-based adhesive composition has been proposed. However, the addition of the hydrophilic monomer may decrease water resistance. The decrease in water resistance may be solved by adding multi-functional monomers or hydrophobic monomers, but the addition of multifunctional monomers or hydrophobic monomers may lead to a decrease in adhesive force. As a solution to solve a reduction in water resistance due to the addition of hydrophilic monomers, a method of adding an isocyanate compound has been proposed, but such isocyanate compounds may cause problems in terms of solution stability, due to a high reactivity with hydrophilic monomers.

As another method to lower the viscosity of the non-water-based adhesive, a method of decreasing the amount of oligomers and adding single functional monomers may be considered, but this method lowers the glass transition temperature of adhesives to weaken the heat resistance and water resistance of the adhesives. Meanwhile, if the glass transition temperature of the adhesive is lower than that of a polarizer, a failure, such as cracking of the polarizer may occur. Although a method of adding multifunctional monomers or monomers having a high glass transition temperature to a homopolymer may be considered to improve the reductions in heat resistance and water resistance of adhesives, the method may decrease the adhesive force.

Therefore, there is a need to develop a non-water-based adhesive for a polarizing plate which has superior adhesive force with respect to films of various materials, for example, a TAC film, an acrylic film, a COP film, a PET film, and the like, and a low viscosity, making thin adhesive layers, and has superior water resistance and heat resistance (thermal impact resistance).

DISCLOSURE

Technical Problem

An aspect of the present invention is to provide an adhesive for a polarizing plate having superior adhesive force, water resistance and heat resistance, and a polarizing plate including the same.

Technical Solution

According to an aspect of the present invention, there is provided an adhesive composition for a polarizing plate including 100 parts by weight of a first epoxy compound having a glass transition temperature of a homopolymer of not less than 120° C., 30 parts by weight to 100 parts by weight of a second epoxy compound having a glass transition temperature of a homopolymer of not more than 60° C., and 0.5 parts by weight to 20 parts by weight of a cationic photopolymerization initiator.

According to another aspect of the present invention, there is provided a polarizing plate including a polarizer, an adhesive layer formed on at least one surface of the polarizer, and a transparent base film formed on the adhesive layer, wherein the adhesive layer is formed of the above-mentioned adhesive composition for a polarizing plate of the present invention. The polarizing plate may further include a primer layer between the adhesive layer and the transparent base film.

Since the adhesive in the polarizing plate of the present invention has a viscosity of not more than 50 cP and a glass transition temperature of not less than 80° C., the polarizing plate may be superior in terms of durability and reliability.

According to another aspect of the present invention, there is provided an optical device including the polarizing plate of the present invention.

Advantageous Effects

Since the adhesive composition of the present invention has superior adhesiveness and a relatively low viscosity with respect to films of various materials, it is possible to make thin the thickness of the adhesive layer to a thickness of not more than 10 μm.

Also, the polarizing plate made by using an adhesive composition of the present invention is superior in terms of water resistance and heat resistance.

BEST MODE

Hereinafter, the present invention will be described in more detail.

The present inventors have performed a large amount of research to lower the viscosity of a non-water-based adhesive without decreasing adhesive force, water resistance and heat resistance thereof, and as a result of the research, have found that in the case that two kinds of epoxy compounds in which the glass transition temperature of a homopolymer satisfies a specific range are included in specific amount ranges, the glass transition temperature of the overall composition may be maintained to a high level and at the same time, the viscosity thereof may be maintained at a low level, resulting in the realization of the present invention.

More specifically, an adhesive for a polarizing plate of the present invention includes (1) 100 parts by weight of a first epoxy compound having a glass transition temperature of a homopolymer of not less than 120° C., (2) 30 parts by weight to 100 parts by weight of a second epoxy compound having a glass transition temperature of a homopolymer of not more than 60° C., and (3) 0.5 parts by weight to 20 parts by weight of a cationic photopolymerization initiator.

In the case of using at least two kinds of epoxy compounds having different glass transition temperatures as in the present invention, a homopolymer having a lower glass transition temperature plays a role in providing adhesive force and viscosity, and in the case of using a homopolymer having a higher glass transition temperature together with the homopolymer having a lower glass transition temperature, the glass transition temperature of the adhesive is not lowered and is advantageous in regard to thermal impact.

Herein, an epoxy compound means a compound having at least one epoxy group in a molecule, preferably a compound having at least two epoxy groups in a molecule, and may include all compounds in a monomer, polymer or resin form. Preferably, epoxy compounds of the present invention may have a resin form.

The first epoxy compound is not particularly limited if it is an epoxy compound having a glass transition temperature of not less than 120° C., and for example, a alicyclic epoxy compound and/or an aromatic epoxy compound having a glass transition temperature of not less than 120° C. may be used as the first epoxy compound of the present invention. Concrete examples of the epoxy compound having a glass transition temperature of not less than 120° C. may include 3,4-epoxycyclohexylmethyl-3,4'-epoxycyclohexanecarboxylate, vinylcyclohexenedioxide dicyclopentadiniene dioxide, bisepoxycyclopentylether, bisphenol A epoxy compound, bisphenol F epoxy compound, and the like. Meanwhile, it is more preferable that in the first epoxy compound, the glass transition temperature of the homopolymer is about 120° C. to about 200° C.

Next, the second epoxy compound is not particularly limited if it is an epoxy compound having a glass transition temperature of not more than 60° C. For example, an alicyclic epoxy compound, an aliphatic epoxy compound, and the like may be used as the second epoxy compound.

At this time, it is preferable to use a 2-functional epoxy compound, i.e., a compound having two epoxy groups as the alicyclic epoxy compound, it is more preferable to use an epoxy compound in which all of two epoxy groups are an alicyclic epoxy group, but the present invention is not limited thereto.

An example of the aliphatic epoxy compound may be an epoxy compound having an aliphatic epoxy group not an alicyclic epoxy group. Examples of the aliphatic epoxy compound having an aliphatic epoxy group not an alicyclic epoxy group may include a polyglycidyl ether of alicyclic polyalcohol; an alkylene oxide-added polyglycidyl ether of alicyclic polyalcohol; a polyglycidyl ether of polyester polyol of aliphatic polyalcohol and aliphatic polycarboxylic acid; a polyglycidyl ether of aliphatic polycarboxylic acid; a polyglycidyl ether of polyester polycarboxylic acid of aliphatic polyalcohol and aliphatic polycarboxylic acid; a dimmer, oligomer or polymer obtained by a vinyl polymerization of glycidyl acrylate or glycidyl methacrylate; and an oligomer or polymer obtained by a vinyl polymerization of glycidyl acrylate or glycidyl methacrylate and another vinyl monomer. Preferably, the polyglycidyl ether of alicyclic polyalcohol or the alkylene oxide-added polyglycidyl ether of alicyclic polyalcohol may be used, but the present invention is not limited thereto.

In the above, examples of the alicyclic polyalcohol may be aliphatic polyalcohols having 2-20 carbon atoms, 2-16 carbon atoms, 2-12 carbon atoms, 2-8 carbon atoms, and 2-4 carbon atoms, and the alicyclic polyalcohol may include, for example, aliphatic diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentane diol, 2,4-diethyl-1,5-pentanediol, 1,6-hexanediol, 1,7-heptanediol, 3,5-heptanediol, 1,8-octane diol, 2-methyl-1,8-octanediol, 1,9-nonanediol, 1,10-decanediol; alicyclic diols, such as cyclohexanedimethanol, cyclohexanediol, hydrogenated bisphenol A, hydrogenated bisphenol F; and three or more-valent polyols, such as trimethylolethane, trimethylolpropane, hexitols, pentitols, glycerin, polyglycerin, pentaerythritol, dipentaerythritol, tetramethylol propane.

Also, in the above, examples of the alkyleneoxide may be alkyleneoxides having 1-20 carbon atoms, 1-16 carbon atoms, 1-12 carbon atoms, 1-8 carbon atoms, or 1-4 carbon atoms, and the alkyleneoxide may include, for example, ethyleneoxide, propyleneoxide, butyleneoxide, and the like.

Also, examples of the aliphatic multivalent carboxylic acid may include, but be not limited to, oxalic acid, malonic acid, succinic acid, glutar acid, adipic acid, pimelic acid, suberic acid, azelaic acid, sebacic acid, dodecanoic acid, 2-methyl-succinic acid, 2-methyladipic acid, 3-methyladipic acid, 3-methylpentanoic acid, 2-methyloctanoic acid, 3,8-dimethyldecanoic acid, 3,7-dimethyldecanoic acid, 1,20-eikosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, 1,2,3-propanetricarboxylic acid, 1,2,3,4-butanetetracarboxylic acid, and 1,2,3,4-cyclobutanetetracarboxylic acid.

Preferably, the second epoxy compound of the present invention may include at least one glycidyl ether group, and at least one selected from the group consisting of 1,4-cyclohexanedimethanol diglycidyl ether, 1,4-butanediol diglycidyl ether, 1,6-hexanediol diglycidyl ether, neopentyl diglycidyl ether, resorcinol diglycidyl ether, diethylenelglycol diglycidyl ether, ethyleneglycol diglycidyl ether, trimethylolpropane triglycidyl ether, n-butyl glycidyl ether, 2-ethylhexyl glycidyl ether, phenyl glycidyl ether, and o-cresyl glycidyl ether may be used as the second epoxy compound.

Meanwhile, it is more preferable that in the second epoxy compound, the glass transition temperature of the homopolymer is about 0° C. to about 60° C.

Meanwhile, it is more preferable to use a combination of a first epoxy compound including an epoxidized aliphatic ring group, and a second epoxy compound including one or more glycidyl ether group as the epoxy compound, but the present invention is not limited thereto. It has been proven that the above-described combination of the first epoxy compound and the second epoxy compound satisfies low viscosity and sufficient adhesive force, and enhances the thermal impact properties of the polarizing plate.

Meanwhile, the second epoxy compound is preferably contained in an amount of 30 parts by weight to 100 parts by weight with respect to 100 parts by weight of the first epoxy compound. If the amount of the second epoxy compound exceeds 100 parts by weight, the glass transition temperature of the overall adhesive composition is lowered and thus heat resistance is also lowered, and if the amount of the second epoxy compound is less than 30 parts by weight, the adhesive force may be lowered.

More preferably, in the adhesive composition for a polarizing plate of the present invention, the weight ratio of the first epoxy compound and the second epoxy compound is preferably 1:1 to 3:1, more preferably 1:1 to 2:1, most preferably 1:1. When the weight ratio of the first epoxy compound and the second epoxy compound satisfies the above range, the most preferable physical properties may be obtained in regard to glass transition temperature and adhesive force.

Meanwhile, the cationic photopolymerization initiator is a compound producing a cation species or Louis acid by irradiation of the active energy line, and may include, but is not limited to, for example, onium salts, such as an aromatic diazonium salt, an aromatic iodine aluminum salt, or an aromatic sulfonium salt, iron-arene complexes, and the like. Meanwhile, the amount of the photo-cationic polymerization initiator is 0.5 parts by weight to 20 parts by weight with respect to 100 parts by weight of the first epoxy compound, preferably 0.5 parts by weight to 15 parts by weight, more preferably 0.5 parts by weight to 10 parts by weight.

Meanwhile, the adhesive for a polarizing plate of the present invention may further include 100 parts by weight to 400 parts by weight of an oxetane compound having at least one oxetanylic group in a molecule, if necessary. The use of the oxetane compound lowers the viscosity of the adhesive to enable the slimness of the adhesive layer.

The oxetane compound is not particularly limited if it has at least one oxetanyl group in a molecule, and may be an oxetane compound well known in the art. Examples of the oxetane compound may include 3-ethyl-3-[(3-ethyloxetane-3-yl)methoxy methyl]oxetane, 1,4-bis[(3-ethyloxetane-3-yl)methoxy methyl]benzene, 1,4-bis[(3-ethyloxetane-3-yl)methoxy]benzene, 1,3-bis[(3-ethyloxetane-3-yl)methoxy]benzene, 1,2-bis[(3-ethyloxetane-3-yl)methoxy]benzene, 4,4'-bis[(3-ethyloxetane-3-yl)methoxy]biphenyl, 2,2'-bis[(3-ethyl-oxetane-3-yl)methoxy]biphenyl, 3,3', 5,5'-tetramethyl-4,4'-bis[(3-ethyloxetane-3-yl)methoxy]biphenyl, 2,7-bis[(3-ethyloxetane-3-yl)methoxy]naphthalene, bis[4-{(3-ethyloxetane-3-yl)methoxy}phenyl]methane, bis[2-{(3-ethyloxetane-3-yl)methoxy}phenyl]methane, 2,2-bis[4-{(3-ethyloxetane-3-yl)methoxy}phenyl]propane, etherified modified compound by 3-chloromethyl-3-ethyloxetane of novolac-type phenol-formaldehyde, 3(4), 8(9)-bis[(3-ethyloxetane-3-yl)methoxymethyl]-tri cyclo-[5.2.1.0 2,6]decane, 2,3-bis[(3-ethyloxetane-3-yl)methoxymethyl]Nordborg I 1,1,1-tris[(3-ethyloxetane3-1)methoxymethyl]propane, 1-butoxy-2,2-bis[(3-ethyloxetane-3-yl)methoxymethyl]butane, 1,2-bis[{2-(3-ethyloxetane-3-yl)methoxy}ethylthio]ethane, bis[{4-(3-ethyloxetane-3-yl)methylthio}phenyl]sulfide, 1,6-bis[(3-ethyloxetane-3-yl)methoxy]-2,2,3,3,4,4,5,5-octa-fluorohexane, and the like. Meanwhile, the amount of the oxetane compound is preferably 100 parts by weight to 400 parts by weight with respect to 100 parts by weight of the first epoxy compound, more preferably 150 parts by weight to 300 parts by weight.

The oxetane compounds having two oxetanyl groups in a molecule are effective in elevating the glass transition temperature of the adhesive layer, whereas the oxetane compounds having one oxetanyl group in a molecule are advantageous in promoting adhesive force.

Meanwhile, the adhesive composition of the present invention may further include a vinyl compound if necessary, together with the foregoing components. If a vinyl compound is added, a low viscosity may be maintained, and a lowering phenomenon in glass transition temperature of the adhesive layer after curing may be decreased.

Examples of the vinyl compound may be hydroxy-$C_{1-6}$ alkyl vinyl ether and/or vinyl acetate, and the hydroxy-$C_{1-6}$ alkyl vinyl ether may be at least one selected from the group consisting of hydroxyethyl vinyl ether, hydroxybutyl vinyl ether, 1,4-cyclohexane dimethanol vinylether, 4-(hydroxymethyl)cyclohexyl methyl vinyl ether, ethylene glycol vinyl ether, diethylene glycol monovinylether.

The vinyl compound may be contained at a weight ratio of 0.1 parts by weight 10 parts by weight or 0.1 parts by weight to 5 parts by weight with respect to 100 parts by weight of the whole adhesive composition.

The adhesive composition for a polarizing plate of the present invention may further include a silane coupling agent if necessary together with the foregoing components. The silane coupling agent may lower a surface energy of the adhesive to enhance the wettability of the adhesive.

It is more preferable that the silane coupling agent includes cationic polymerization functional groups, such as epoxy groups, vinyl groups, and radical groups. The present inventors have found that the use of the silane coupling agent including the cationic polymerization functional groups may improve the wettability without lowering the glass transition temperature of the adhesive, unlike the case of using the silane coupling agent which doesn't include the cationic polymerization functional groups or surfactant. The reason is that the cationic polymerization functional groups of the silane coupling agent react with silane groups of the adhesive composition to form cross-links, thus decreasing the lowering phenomenon in glass transition temperature of the adhesive layer after curing.

The silane coupling agent that is usable in the present invention may be, but limited to, for example, a silane coupling agent expressed by formula 1:

$$Si(R_1)_n(R_2)_{4-n}$$ [Formula 1]

where $R_1$ is a cationic polymerization functional group that is bonded to Si atom and includes cyclic ether group or vinyloxy group, $R_2$ is hydrogen, hydroxy group or alkoxy group which is bonded to Si atom, and n is an integer between 1 and 4.

Concrete examples of the silane coupling agent satisfying Formula 1 may include, but are not limited to, 2-(3,4-epoxycyclohexyl)ethyl trimethoxy silane, 3-glycidoxypropyl trimethoxy silane, glycidoxypropyl methyldiethoxy silane, glycidoxypropyl triethoxy silane, vinyltrimethoxy silane or vinylethoxy silane.

Also, the silane coupling agent that is usable in the present invention may include an oligomer type silane compound including cationic polymerization functional groups introduced into a molecule of siloxane oligomer. At this time, the siloxane oligomer may be a low molecular silicon resin of which a molecular-chain end is blocked by an alkoxysilyl group.

Meanwhile, the adhesive composition may be contained at a weight ratio of 0.1 parts by weight to 10 parts by weight or 0.1 parts by weight to 5 parts by weight with respect to 100 parts by weight of the whole adhesive composition. The adhesive layer may exhibit a proper surface energy and adhesivity in the above range.

Meanwhile, the cationic adhesive composition of the present invention may further include a radical polymerization monomer if necessary. Compounds having a radical reactive functional group may be used for the radical polymerization monomer without any limitation, and may include, for example, (meth)acrylates having one or more (meth) acryloyl group, (meth)acrylic amides, maleimides, (meth) acrylic acid, maleic acid, itaconic acid, (meth)acryl aldehyde, (meth)acryloyl morpholine, N-vinyl-2-pyrrolidone, triallylisocyanulate, and the like.

At this time, concrete examples of (meth)acrylates having one (meth)acryloyl group in a molecule may include methyl (meth)acrylate, ethyl(meth)acrylate, propyl(meth)acrylate, isopropyl(meth)acrylate, butyl(meth)acrylate, isobutyl (meth)acrylate, 2-ethylhexyl(meta)acrylate, octyl(meth) acrylate, isooctyl(meth)acrylate, lauryl(meth)acrylate, stearyl(meth)acrylate, 2-hydroxyethyl(meth)acrylate, 2-hydroxy-propyl(meth)acrylate, 4-hydroxybutyl(meth)acrylate, cyclohexyl(meth)acrylate, isobornile(meth)acrylate, 1,4-cyclohexane dimethylolmono(meth)acrylate, dicyclopentanyl (meth)acrylate, dicyclopentenyl(meth)acrylate, dicyclopentenyloxyethyl(meth)acrylate, benzyl(meth)acrylate, (meth) acrylate of phenol alkylene oxide adduct, (meth)acrylate of p-kumil phenol alkylene oxide adduct, (meth)acrylate of o-phenyl-phenol alkylene oxide adduct, (meth)acrylate of nonyl phenol alkylene oxide adduct, 2-methoxy-ethyl(meth) acrylate, ethoxy ethoxyethyl(meth)acrylate, (meth)acrylate of 2-ethylhexyl alcohol alkylene oxide adduct, ethylene glycol mono(meth)acrylate, propylene glycol mono(meth) acrylate, pentane diol mono(meth)acrylate, hexanediol mono(meth)acrylate, diethylene glycol mono(meth)acrylate, triethylene glycol mono(meth)acrylate, tetraethylene glycol mono(meth)acrylate, polyethylene glycol mono(meth)acrylate, dipropylene glycol mono(meth)acrylate, tripropylene glycol mono(meth)acrylate, polypropylene glycol mono (meth)acrylate, 2-hydroxy-3-phenoxy-propyl(meth)acrylate, 2-hydroxy-3-butoxy propyl(meth)acrylate, tetrahydrofurfuryl(meth)acrylate, caprolactone degeneration tetrahydrofurfuryl(meth)acrylate, 2-ethyl-2-methyl-1,3-dioxolane-4-yl)methyl(meth)acrylate, (2-isobutyl-2-methyl-1, 3-dioxolane-4-yl)methyl(meth)acrylate, (1,4-dioxaspiro[4, 5]decane-2-yl)methyl(meth)acrylate, glycidyl(meth) acrylate, 3,4-epoxy cyclohexyl methyl(meth)acrylate, (3-ethyloxetane-3-yl)methyl(meth)acrylate, 2-(meth)acryloyloxymethyl isocyanate, allyl(meth)acrylate, N-(meth) acryloyloxyethyl hexahydrophthalimide, N-(meth)acryloyloxyethyl tetrahydro phthalimide, 2-(meth)acryloyloxyethyl hexahydro phthalic acid, 2-(meth)acryloyloxyethyl oxyethyl succinic acid, ω-carboxy polycaprolactone mono(meth) acrylate, 2-(meth)acrylate oxyethyl acid phosphate, and the like.

Concrete examples of (meth)acrylic amides may include (meth)acrylamide, N,N-dimethyl(meth)acrylamide, N,N-diethyl(meth)acrylamide, N-methylol(meth)acrylamide, N-(3-N,N-dimethylaminopropyl)(meth)acrylamide, methylenebis (meth)acrylamide, ethylenebis(meth)acrylamide, N,N-diallyl(meth)acrylamide, and the like.

Concrete examples of maleimides may include N-methyl maleimide, N-hydroxyethyl maleimide, N-hydroxyethylcitraconimide, urethane acrylate of N-hydroxyethylcitraconimde and isophorone diisocyanate, and the like.

Concrete examples of (meth)acrylates having two (meth) acryloyl groups in a molecule may include 1,3-butanedioldi (meth)acrylate, 1,6-hexanedioldi(meth)acrylate, 1,9-nonanedioldi(meth)acrylate, 1,10-decanedioldi(meth) acrylate, 1,3-butyleneglycoldi(meth)acrylate, 2-methacryloyloxyethyl phosphate, ethyleneglycoldi(meth) acrylate, diethyleneglycoldi(meth)acrylate, triethyleneglycoldi(meth)acrylate, neopentylglycoldi(meth)acrylate, dipropyleneglycoldi(meth)acrylate, tripropyleneglycoldi (meth)acrylate, tetraethyleneglycoldi(meth)acrylate, cyclohexanedimethanoldi(meth)acrylate, polyethyleneglycoldi (meth)acrylate, polyethyleneglycol(200)di(meth)acrylate, polyethyleneglycol(400)di(meth)acrylate, polyethyleneglycol(600)di(meth)acrylate, glycerinedi(meth)acrylate, 2-hydroxy-3-acryloyloxypropylmethacrylate, dimethyloyltricyclodecanedi(meth)acrylate, and the like.

Concrete examples of (meth)acrylates having three (meth)acryloyl groups in a molecule may include trimethylolpropane tri(meth)acrylate, trimethylolpropane tri(meth) acrylate, trimethylolpropane tri(meth)acrylate, ditrimethylolpropane tri(meth)acrylate, trimethylpropane tri(meth) acrylate, tri(2-hydroxy ethyl)isocyanurate triacrylate, tri(2-hydroxy ethyl)isocyanurate, pentarythritol triacrylate, ethoxylate trimethylolpropane tri(meth)acrylate, proxylatetrimethylolpropane tri(meth)acrylate, and the like.

Concrete examples of (meth)acrylates having four or five (meth)acryloyl groups in a molecule may include pentarythritol tetra(meth)acrylate, di trimethylolpropane tetra(m- eth)acrylate, dipentarythritol penta(meth)acrylate, epoxylate pentarythrotol tetra(meth)acrylate, pentaacrylate ester, and the like.

Concrete examples of (meth)acrylates having six (meth)acryloyl groups in a molecule may include dipentarythritol hexa(meth)acrylate.

The amount of the radical polymerization monomer is 0 parts by weight to 40 parts by weight with respect to 100 parts by weight of the whole adhesive composition, preferably 5 parts by weight to 30 parts by weight, more preferably 5 parts by weight to 25 parts by weight.

Meanwhile, in the case that the adhesive composition includes radical polymerization monomers as above, it is preferable to mix a photo-radical polymerization initiator in order to promote the radical polymerization and thus enhance the curing speed. Examples of the photo-radical polymerization initiator may include, but are not limited to, an acetonephenone-based photopolymerization initiator, a benzoin ether-based photopolymerization initiator, a benzophenone-based photopolymerization initiator, thioxanthone-based photopolymerization initiator, and the like. The amount of the photo-cationic polymerization initiator is 0.5 parts by weight to 20 parts by weight with respect to 100 parts by weight of the whole adhesive composition, preferably 0.5 parts by weight to 15 parts by weight, more preferably 0.5 parts by weight to 10 parts by weight.

The adhesive composition for a polarizing plate may further include a photo enhancer, an antioxidant, oligomer, and an adhesive promoter if necessary, and preferably, may further include urethane acrylate at a weight ratio of more than 0 and not more than 4 parts by weight. In the case that urethane acrylate is added as above, there is a rising tendency of viscosity, but the viscosity of the adhesive may be lowered by elevating temperature. Meanwhile, in the case that urethane acrylate is added as above, it is possible to provide more proper adhesive force in the use of the adhesive composition for acrylic films.

The above-mentioned adhesive composition of the present invention has a glass transition temperature of not less than 80° C., preferably 80-120° C. as being cured. When 80° C. heat resistant durability and thermal impact were evaluated, it was exhibited that in the case of a polarizing plate which was manufactured by using the adhesive composition of the present invention, breakage of the polarizer did not occur.

Also, since the adhesive composition of the present invention has a low viscosity ranging from 15 cp to 80 cp at 25° C., preferably from 15 cp to 50 cp, it exhibits superior workability and superior adhesive force in the case of thin adhesive layers.

A polarizing plate according to the present invention will now be described.

The polarizing plate according to the present invention is characterized by including a polarizer, an adhesive layer formed on at least one surface of the polarizer, a transparent base film formed on the adhesive layer, and a primer layer formed between the adhesive layer and the transparent base film. That is, the polarizing plate of the present invention may have a structure of polarizer/adhesive layer/primer layer/transparent base film or a structure of transparent film/primer layer/adhesive layer/polarizer/adhesive layer/primer layer/transparent base film.

At this time, the polarizer is not particularly limited, and may be one known in the art, for example, a film made of polyvinylalcohol (PVA) including iodine or dichroic dye. Throughout the present specification, a polarizer means a film that does not include a protective film (i.e., transparent base film), and a polarizing plate means a film that includes a protective film (i.e., transparent base film).

Next, the adhesive layer is formed of the above-mentioned adhesive composition for a polarizing plate. A concrete description of the adhesive composition for a polarizing plate is the same as the above-mentioned description, and thus, description thereof will be omitted. Meanwhile, it is preferable that the adhesive layer formed of the adhesive composition for a polarizing plate according to the present invention has a thickness of more than 0 and not more than 10 µm, preferably about 0.1 µm to about 5 µm. If the thickness of the adhesive layer is less than 0.1 µm, uniformity and adhesive force of the adhesive layer may be lowered, and if the thickness of the adhesive layer exceeds 10 µm, curling of the polarizing plate may occur.

Next, the primer layer is to enhance the adhesive force of the transparent films and the adhesive layers, and is preferably formed of a primer composition including a urethane polymer. For example, the primer composition includes a urethane polymer, water-dispersible fine particles, and water, more specifically, 1 part by weight to 50 parts by weight with respect to 100 parts by weight of the primer composition of an urethane polymer, 0.1 parts by weight to 10 parts by weight of water-dispersible fine particles, and the balance of water.

The urethane polymer is obtained by reacting polyol and polyisocyanate. The polyol is not particularly limited if it has two or more hydroxyl groups in a molecule, and any proper polyol may be employed. For example, the polyol may be polyesterpolyol, polyether polyol, polycarbonatediol, or the like, and polyesterpolyol, polyether polyol, and polycarbonatediol may be used alone or in combinations thereof.

Preferably, the polyol may be at least one selected from the group consisting of ethylene glycol, 1,2-propaneondiol, 1,3-propanediol, 1,3-butanediol, 1,4-butanediol, neolpentylglycol, pentanediol, 1,6-hexanediol, 1,8-octanediol, 1,10-decanediol, 4,4'-dihydroxyphenylpropane, 4,4'-dihydroxymethylmethane, diethyleneglycol, triethyleneglycol, polyethyleneglycol, dipropyleneglycol, polypropyleneglycol, 1,4-cyclohexanedimethanol, 1,4-cyclohexanediol, bisphenol A, bisphenol F, glycerine, 1,1,1-trimethylolpropane, 1,2,5-hexatriol, pentaerythriol, glucose, sucrose, and sorbitol.

Meanwhile, the polyesterpolyol may be representatively obtained by reacting a polybasic acid component and a polyol component. Examples of the polybasic acid component may include aromatic dicarboxylic acids, such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, tetrahydrophthalic acid, and the like; aliphatic dicarboxylic acids, such as oxalic acid, succinic acid, malonic acid, glutaric acid, adipic acid, pimelic acid, suberic acid, azelaic acid, sebacic acid, linoleic acid, maleic acid, fumaric acid, mesaconic acid, itaconic acid; and the like; alicyclic dicarboxylic acids, such as hexa-hydro phthalic acid, tetrahydro phthalic acid, 1,3-cyclohexane dicarboxylic acid, 1,4-cyclohexane dicarboxylic acid, and the like; and reactive derivatives, such as acid anhydrides thereof, alkyl ester, acid halide. The above-mentioned polybasic acid components may be used alone or in combinations thereof. Further, it is more preferable that the polybasic acid component is at least one selected from the group consisting of polytetramethyleneglycol (PTMG), polypropyleneglycol (PPG), and polyethyleneglycol (PEG).

It is preferable that the polycarbonatepolyol is at least one selected from the group consisting of poly(hexamethylene carbonate)glycol and poly(cyclohexanecarbonate)glycol.

The polyether polyol may be obtained by ring-opening polymerization of alkyleneoxide to a polyalcohol. Examples of the polyalcohol may include ethyleneglycol, diethyleneglycol, propyleneglycol, dipropyleneglycol, glycerin, trimethylolpropane, and the like. The foregoing organic solvents may be used alone or in combinations thereof.

The isocyanate is not limited if it is a compound having two or more NCO groups, and may include, for example, toluene diisocyanate (TDI), 4,4-diphenyl methane diisocyanate (MDI), 1,5-naphthalene diisocyanate (NDI), tolidine diisocyanate (TODI), hexamethylene diisocyanate (HMDI), isophorone diisocyanate (IPDI), p-phenylene diisocyanate, transcyclohexane, 1,4-diisocyanate, and xylene diisocyanate (XDI). These isocyantes may be used alone or in combinations thereof.

A preparation method of the urethane resin may employ any proper method known in the art. Concrete example of the known method may include an one shot method reacting respective components once, and a multi-stage method reacting respective components in stages. In the case that the urethane resin has a carboxylic group, the urethane resin is preferably prepared with the multi-stage method because the multi-stage method may easily introduce the carboxylic group. Further, while the urethane resin is prepared, any proper urethane reaction catalyst may be used.

In the preparation of the urethane resin, another polyol and/or another chain extender may be added for a reaction in addition to the above components.

Examples of another polyol may include polyols having three or more hydroxyl groups, such as sorbitol, glycerin, trimethylolethane, trimethylolpropane, pentaerythritol, and the like.

Examples of another chain extender may include glycols, such as ethyleneglycol, diethylene glycol, triethylene glycol, 1,3-propanediol, 1,3-butanediol, 1,4-butanediol, neopentyl glycol, pentane diol, 1,6-hexane diol, propylene glycol, and the like; aliphatic diamines, such as ethylene diamine, propylene diamine, hexamethylene diamine, 1,4-butane diamine, aminoethyl alkanolamine, and the like; alicyclic diamines, such as isophorone diamine, 4,4'-dicyclohexylmethane diamine, and the like; and aromatic diamines, such as xylylene diamine, tolylene diamine, and the like.

Further, while the urethane resin is prepared, a neutralizer may be used. The use of the neutralizer may enhance the stability of the urethane resin in water. Examples of the neutralizer may include, for example, N-methylmorpholine, triethylamine, dimethylethanolamine, methyldiethanolamine, triethanolaminealkyne, morpholine, tripropylamine, ethanolamine, triisopropanolamine, and the like. The foregoing organic solvents may be used alone or in combinations thereof.

In preparing the urethane resin, an organic solvent which is inactive with respect to the polyisocyanate and is miscible with water is used. Examples of the organic solvent may include ester-based solvents, such as ethyl acetate, ethylcellosolve acetate, and the like; ketone-based solvents, such as acetone, methylethylketone, methylisobutylketone, and the like; ether-based solvents, such as dioxane, tetrahydrofuran, and the like. The foregoing organic solvents may be used alone or in combinations thereof.

Meanwhile, it is more preferable that the urethane polymer includes a carboxylic group. The reason the urethane polymer includes a carboxylic group is because water dispersibility is enhanced to thus further enhance the adhesion between the adhesive layer and the transparent base film.

The urethane polymer including the carboxylic group may be obtained, for example, by reacting a chain extender with polyol and polyisocyanate. Examples of the chain extender having the carboxylic group may include dihydroxy carboxylic acid, dihydroxy succinate, and the like. Examples of the dihydroxy carboxylic acid may include dialylol alkanic acids including dimethylolalkanic acid, such as dimethylolacetic acid, dimethyolbutanoic acid, dimethylol propionic acid, dimethyolbutyric acid, dimethylol pentanoic acid, or the like. The above-mentioned polybasic acid components may be used alone or in combinations thereof.

Meanwhile, the amount of the urethane polymer is preferably about 1 part by weight to about 50 parts by weight with respect to 100 parts by weight of the primer composition, more preferably about 3 parts by weight to about 20 parts by weight, most preferably 5 parts by weight to 15 parts by weight. If the urethane polymer is contained at a weight ratio less than 1 part by weight, the adhesiveness is lowered, and if the urethane polymer is contained at a weight ratio more than 30 parts by weight, the viscosity is increased, so that a leveling may be not achieved and a dying time may be increased.

The weight average molecular weight of the urethane polymer is preferably 10,000 to 100,000. If the weight average molecular weight is less than 10,000, the adhesive force is lowered, and if the weight average molecular weight exceeds 100,000, it is difficult to prepare a water-dispersible urethane.

The water-dispersible fine particles that are usable in the present invention may be any proper fine particles, preferably water-dispersible fine particles. Specifically, both of inorganic fine particles and organic fine particles may be used. Examples of the inorganic fine particles may include inorganic oxide particles, such as silica, titania, alumina, zirconia, antimony oxides, and the like. Examples of the organic fine particles may include silicon resins, fluorine resins, (meth)acrylic resins, cross-linked polyvinyl alcohols, melamine resins, and the like.

Among the water-dispersible fine particles, silica is preferably used. The reason silica is used is because silica is superior in blocking inhibition and transparency not to generate haze, and is free of colorization to have a small influence on the optical properties of the polarizing plate. Also, since silica is good in terms of dispersibility and dispersion stability with respect to primer compositions, the workability for forming the primer layer is more superior than other materials.

The average diameter (average primary particle diameter) of the water-dispersible fine particles is preferably 10 nm to 20 nm, more preferably 20 nm to 70 nm. When the average diameter of the water-dispersible fine particles is less than 10 nm, surface energy is increased, so that agglomeration and precipitation of silica in a primer solution occurs to cause a problem in stability of the solution. When the average diameter is more than 200 nm, silica particles are not uniformly dispersed in the solution and are agglomerated, so that the size of silica is increased to a size larger than the wavelength band (400-800 nm) of visible light, and thus silica scatters light of not less than 400 nm to increase haze. By using the fine particles having the foregoing diameter range, irregularities may be properly formed at the surface of the primer layer to effectively reduce frictional force in contact surface between an acrylic-based film and the primer layer and/or between the primer layers. As a result, blocking inhibition may be further enhanced.

Meanwhile, it is preferable that the amount of the water-dispersible fine particles is 0.1 parts by weight to 10 parts by weight with respect to 100 parts by weight of the primer composition. If the amount of the water-dispersible is less than 0.1 parts by weight, slippage between films on winding does not occur, so that film tearing may occur. If the amount of the water-dispersible exceeds 10 parts by weight, haze may occur.

Since the primer composition of the present invention is aqueous, the fine particles are preferably mixed in an aqueous dispersion form. Specifically, in the case that silica is employed as fine particles, silica is preferably mixed in a colloidal silica form. As the colloidal silica, products commercially available in the art may be used, and for example, Snowtex series from Nissan chemical, AEROSIL series from Air product, Epostar series from Nippon catalyst, and Soliostar RA series, LSH series from Ranco, and the like may be used.

Meanwhile, the primer composition may further include a cross-linking agent if necessary. Methylol compounds, such as oxazolin, boric acid, trimethylolmelamine, and the like, carbodiimide, isocyanate, azyridine compounds, and the like may be used as the cross-linking agent.

The cross-linking agent is preferably contained at an amount of 0.1 parts by weight to 30 parts by weight with respect to 100 parts by weight of the primer composition. In the case that a primer containing the cross-linking agent is used, since the primer layer prevents water from being penetrated, the primer composition exhibits superior optical properties, such as water resistance and moisture and heat resistance.

Meanwhile, in the case that the primer composition is applied to a double-sided polarizing plate, the amount of the cross-linking agent contained in the primer layer may vary with whether the primer composition is applied to which surface of the double-sided polarizing plate. Herein, a double-sided polarizing plate means a polarizing plate of which a transparent base film is attached to both surfaces of a polarizer, and is discriminated from a single-sided polarizing plate of which a transparent base film is attached to one surface of a polarizer. That is, according to the present invention, the double-sided polarizing plate means a polarizing plate having a structure of transparent base film/primer layer/adhesive layer/polarizer/adhesive layer/primer layer/transparent base film. Meanwhile, in manufacturing the double-sided polarizing plate, an active energy line is irradiated onto the adhesive layer to cure the adhesive layer. At this time, the active energy line may be irradiated to the polarizing plate from one direction or both directions. If the active energy line is irradiated from one direction only, the primer layer formed on an irradiated surface of the active energy line may be different in amount of the cross-linking agent from the primer layer formed on a non-irradiated surface of the active energy line. More specifically, the amount of the cross-linking agent in the primer layer formed on the irradiated surface is preferably higher than that in the primer layer formed on the non-irradiated surface In the case of the non-irradiated surface of the active energy line, since the curing speed of the adhesive is slower than that in the irradiated surface, when the cross-linking degree of the primer layer is low, the primer layer may be mixed into the adhesive layer to cause the adhesive layer not to be cured, thereby weakening the adhesive force.

Also, the primer composition may further include a silane coupling agent, a fluorine surfactant, a silane surfactant, and a surfactant containing an alkyl group as other additives if necessary.

The primer layer formed of the above primer composition is preferably about 100 nm to about 1 μm thick. If the primer layer is not more than 100 nm, the adhesive force is decreased, and if the primer layer is not less than 1 μm, the primer layer coated is not completely dried and thus blocking between films may occur, resulting in a tearing of the films.

Also, it is preferable that a water contact angle of a surface of the primer layer is 40 degrees to 100 degrees, more preferably 50 degrees to 90 degrees, most preferably 60 degrees to 80 degrees. If the water contact angle is less than 40 degrees, the hydrophilicity of the primer layer is increased and thus the primer layer reacts with iodine of the polarizer to inhibit an arrangement of iodine, thus scattering a single body color and deteriorating the degree of polarization. If the water contact angle exceeds 100 degrees, the hydrophobicity of the primer layer is increased and thus adhesion between the primer layer and the polarizer is made difficult.

Next, the transparent base film is a polarizer protective film or a compensation film for compensating for light characteristics of the polarizer, and may include polymer films known to the art. More specifically, the transparent base film may be at least one selected, but not limited to, from the group consisting of, for example, an acrylic film, a PET film, an acrylic-based primer-treated PET film, a polynorbornene (PNB) film, a COP film, a polycarbonate film and TAC films including an NRT (Fuji film), an N TAC (Konica), a V TAC (Fuji film), a UZ TAC (Fuji film), and the like. Among the foregoing films, the acrylic film is particularly preferable.

In the present invention, the acrylic film used as the transparent film may contain a (meth)acrylate resin. The film containing the (meth)acrylate resin may be obtained, for example, by extruding a forming material containing the (meth)acrylate resin as a main component.

The acrylic film may be a film including a copolymer having an alkyl(meth)acrylate unit and a styrene unit, and an aromatic resin having a carbonate group at a main chain thereof, or a film including an alkyl(meth)acrylate unit, a styrene unit, 3 to 6-membered heterocyclic unit substituted with at least one carbonyl group, and a vinyl cyanide unit.

The acrylic film may be a film including a (meth)acrylate resin having an aromatic ring. An example of the (meth)acrylate resin having the aromatic ring is a resin composition described in Korean Patent Laid Open Publication No. 10-2009-0115040 and including (a) a (meth)acrylate unit including one or more (meth)acrylate derivative; (b) an aromatic unit having a chain with a hydroxy group-contained part, and an aromatic part; and (c) a styrene unit including one or more styrene derivative. The units (a) to (c) may be contained in a resin composition in a copolymer form, or at least two of the units (a) to (c) may be contained in a resin composition in a copolymer form.

The acrylic film may be a film including an acrylic resin having a lactone ring structure. Concrete examples of the (meth)acrylate resin having the lactone ring structure are described in Japanese Patent Application Laid Open Publication No. 2000-230016, Japanese Patent Application Laid Open Publication No. 2001-151814, Japanese Patent Application Laid Open Publication No. 2002-120326, etc.

A method of preparing the acrylic film is not particularly limited. For example, the acrylic film may be prepared with sufficiently mixing a (meth)acrylate resin, a polymer, and additives by any proper mixing method to form a thermoplastic resin composition, and then forming a film from the thermoplastic resin composition, or by preparing a (meth)

acrylate resin, a polymer, and additives in respective separate solutions, mixing the solutions to form a uniform mixing solution, and then forming a film from the mixing solution.

The thermoplastic resin composition is prepared, for example, by preblending the film raw materials by using any proper mixer, such as an omni mixer to obtain a mixture and then extruding and mulling the obtained mixture. In this case, the mixer used in the extruding and mulling is not particularly limited, and any proper mixer, such as a single-screw extruder, a double-screw extruder, a dispersion kneader, or the like may be used.

The method of forming a film may include any proper forming methods, such as, a solution casting method (solution emulsifying method), a melt extrusion method, a calendar method, a compressive molding method. Among the foregoing film forming methods, the solution casting method (solution emulsifying method) and the melt extrusion method are preferable.

Examples of a solvent used in the solution casting method (solution emulsifying method) may include: aromatic hydrocarbons such as benzene, toluene, xylene, and the like; aliphatic hydrocarbons such as cyclohexane, decalin, and the like; esters such as ethyl acetate, butyl acetate; ketones such as acetone, methyl ethyl ketone, methyl isobutyl ketone, and the like; alcohols such as methanol, ethanol, isopropanol, butanol, isobutanol, methyl cellosolve, ethyl cellosolve, butyl cellosolve, and the like; ethers such as tetrahydrofuran, dioxane, and the like; halogenated hydrocarbons such as dichloromethane, chloroform, carbon tetrachloride, and the like; dimethylformamide; dimethyl sulfoxide, and the like. These solvents may be used or in combinations thereof.

Examples of an apparatus for performing the solution casting method (solution emulsifying method) may include a drum type casting machine, a band type casting machine, a spin coater, and the like. Examples of the melt extrusion method may include a T-die method, an inflation method, and the like. The forming temperature is preferably 150-350° C., more preferably 200-300° C.

In the case that the film is formed by using the T-die method, a T-die is installed at a front edge of a single-screw extruder or double-screw extruder published, and the film extruded is wound to obtain a roll-shaped film. At this time, by properly adjusting the temperature of the winding roll to apply an elongation in an extruding direction, the film may be uniaxially elongated. By elongating the film in a perpendicular direction to the extrusion direction, a simultaneous biaxial elongation or a sequential biaxial elongation may be performed.

The acrylic film may be any of a non-elongated film or an elongated film. In the case of the elongated film, the elongated film may be a uniaxial elongation film or a biaxial elongation film, and in the case of the biaxial elongation film, the biaxial elongation film may be any of a simultaneous biaxial elongation film or a sequential biaxial elongation film. The biaxial elongation enhances the mechanical strength of the film to thus enhance the film performance. In the case that the acrylic film mixed with another thermoplastic resin is elongated, the acrylic film may suppress an increase in phase difference and maintain the optical isotropy.

The elongation temperature is preferably in a range near the glass transition temperature of the thermoplastic resin composition that is a film raw material, for example, (glass transition temperature −30° C.) to (glass transition temperature +100° C.), more preferably, (glass transition temperature −20° C.) to (glass transition temperature +80° C.). If the elongation temperature is less than (glass transition temperature −30° C.), a sufficient extension magnification may not be obtained. On the contrary, if the elongation temperature exceeds (glass transition temperature +100° C.), the flow of the resin composition may occur to hinder a stable elongation.

The elongation magnification defined by an area ratio is 1.1 to 25 times, more preferably 1.3 to 10 times. If the elongation magnification is less than 1.1 times, an enhancement in toughness following the elongation may not be obtained. If the elongation magnification exceeds 25 times, an effect according to an increase in elongation magnification may be insufficient.

The elongation speed in one direction is preferably 10-20,000%/min, more preferably 100-10,000%/min. If the elongation speed is less than 10%/min, a long time may be required to obtain a sufficient elongation magnification to elevate the preparation costs. If the elongation speed exceeds 20,000%/min, a tearing of the elongated film may occur.

The acrylic film may be thermally annealed after elongation, so as to stabilize the optical isotropy or mechanical characteristics thereof. The annealing condition is not particularly limited, and any proper condition known in the art may be employed.

Meanwhile, a surface treatment for enhancement of the adhesive force may be performed with respect to the transparent films if necessary. For example, at least one surface treatment selected from the group consisting of an alkali treatment, a corona treatment, and a plasma treatment.

Meanwhile, in the polarizing plate of the present invention, the adhesive layer, the primer layer, and the transparent base film may be attached to one surface only or both surfaces of the polarizer. In the case of a single-sided polarizer in which the adhesive layer, the primer layer and the transparent base film are attached to one surface only, the primer layer is preferably formed of a primer composition containing 5-15% of a solid component, and it is preferable that the primer composition contains the cross-linking agent in an amount of 0-30 parts by weight. Also, it is preferable that the primer layer is formed to have a thickness ranging from 200 nm to 400 nm.

Meanwhile, in the case of a double-sided polarizing plate in which the adhesive layer, the primer layer and the transparent base film are attached to both surfaces of the polarizer, it is preferable that the primer layer formed on a non-irradiated surface of UV is higher in amount of the cross-linking agent than the primer layer formed on an irradiated surface of UV. For example, the primer layer on the irradiation surface is preferably formed of a primer composition containing about 5-15% of a solid component, and the primer composition preferably contains 0-30 parts by weight of a cross-linking agent with respect to 100 parts by weight of the primer composition. Also, it is preferable that the primer layer is formed to have a thickness ranging from 200 nm to 400 nm.

Meanwhile the primer layer on the non-irradiated surface is preferably formed of a primer composition containing about 5-15% of a solid component, and the primer composition preferably contains 5-30 parts by weight of a cross-linking agent with respect to 100 parts by weight of the primer composition. Also, it is preferable that the primer layer is formed to have a thickness ranging from 200 nm to 400 nm.

Since the non-irradiated surface of UV is smaller than amount of UV than the irradiated surface of UV, if the non-irradiated surface of UV has the same composition as the irradiated surface of UV, the primer layer on the non-irradiated surface of UV may be less cured than the primer layer on the irradiated surface of UV. Therefore, it is preferable to completely cure the primer layer by increasing the amount of the cross-linking agent in the primer layer on the non-irradiated surface of UV.

The foregoing polarizing plate according to the present invention may be manufactured, for example, by coating a primer composition on one surface of a transparent film to form a primer layer, coating an adhesive composition on one surface of the primer layer or a polarizer to form an adhesive layer, attaching the polarizer and the transparent base film, and curing the adhesive composition through a light irradiation.

Also, when the polarizing plate configured as above according to the present invention was immersed in water of 60° C. for 24 hours, decoloration of the polarizer was less than 10 mm in the MD direction, resulting in very superior water resistance.

The polarizing plate according to the present invention may be usefully applied to optical devices, such as liquid crystal displays, etc. For example, the optical device of the present invention may be a liquid crystal panel or a liquid crystal display including such a liquid crystal panel and polarizing plates disposed on both surfaces of the liquid crystal panel. At this time, one of the polarizing plates may be a polarizing plate according to the present invention. At this time, the type of the liquid crystal panel included in the liquid crystal display is not particularly limited. For example, published panels, for example, passive matrix panels, such as a twisted nematic (TN) type, a super twisted nematic (STN) type, a ferroelectric (F) type, or a polymer dispersed type (PD); active matrix panels such as a two terminal type, or a three terminal type; an in plane switching (IPS) panel; and a vertical alignment (VA) panel may be all applied regardless of the type. Also, types of other elements constituting the liquid crystal display, for example, upper and lower substrates (i.e., color filter substrate and array substrate) are not particularly limited, and elements published in the art may be employed without any limitation.

[Mode For Invention]

Hereinafter, the present invention will be described in more detail with examples thereof. However, following examples are merely provided for illustration, and the scope of the present invention is not limited to the following examples.

PREPARATION EXAMPLE 1

Preparation of Transparent Base Film

A resin composition, in which poly(N-cyclohexylmaleimide-co-methylmethacrylate) resin, styrene-maleic anhydride copolymer resin and phenoxy resin were uniformly mixed at a weight ratio of 100:2.5:5, was supplied to a 24φ-extruder that was substituted with nitrogen from a raw material hopper to the extruder, and melted at 250° C. to obtain raw material pellets.

As the phenoxy resin, PKFE (Mw=60,000, Mn=16,000, T.sub.g=98° C.) by InChemRez® Co., Ltd., was used; as the styrene-maleic anhydride copolymer resin, Dylaeck 332 containing 85 wt % of styrene and 15 wt % of maleic anhydride was used; and the poly(N-cyclohexylmaleimide-co-methylmethacrylate) resin in which the amount of N-cyclohexylmaleimide measured by NMR analysis is 6.5 wt % was used.

The obtained raw material pellets were dried under a vacuum, melted at 260° C. by using the extruder and passed through a coat hanger typed T-die, and then passed through the chrome coated casting roll and the drying roll to thereby manufacture a film having a thickness of 150 μm. This film was elongated by a ratio of 170% using a difference in speed between rolls in an MD direction at 125° C. by using a pilot elongating apparatus.

EXAMPLE 2

Adhesive Composition (1) Adhesive Composition A 5 parts by weight of CPI 100P (Sanapro) as a cationic initiator was added to 100 parts by weight of a resin composition which was obtained by adding 25 wt % of 3,4-epoxycyclohexylmethyl-3,4'-epoxycyclohexanecarboxylate (Celloxide 2021P by Dicel Chemical Industries, Ltd) of which a homopolymer has a glass transition temperature of 190° C., and 25 wt % of 1,4-cyclohexane dimethanol diglycidylether of which a homopolymer has a glass transition temperature of 25° C., and 50 wt % of 3-ethyl-3-[(3-ethyloxetane-3-yl)methoxymethyl]oxetane (Aron Oxcetane DOX 221, by Toagosei Co., Ltd.), thus preparing an adhesive composition A for a polarizing plate. It was measured that the adhesive composition A had a viscosity of 35 cP and a glass transition temperature of 102° C.

(2) Adhesive Composition B 5 parts by weight of CPI 100P (Sanapro) as a cationic initiator was added to 100 parts by weight of a resin composition which was obtained by adding 25 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 25 wt % of neopentyl glycol diglycidylether of which a homopolymer has a glass transition temperature of 10° C., and 50 wt % of 3-ethyl-3-[(3-ethyloxetane-3-yl)methoxymethyl]oxetane (Aron Oxcetane DOX 221, by Toagosei Co., Ltd.), thus preparing an adhesive composition B for a polarizing plate. It was measured that the adhesive composition B had a viscosity of 25 cP and a glass transition temperature of 95° C.

(3) Adhesive Composition C 5 parts by weight of CPI 100P (Sanapro) as a cationic initiator was added to 100 parts by weight of a resin composition which was obtained by adding 25 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 25 wt % of trimethylolpropane triglycidylether of which a homopolymer has a glass transition temperature of 45° C., and 50 wt % of 3-ethyl-3-[(3-ethyloxetane-3-yl)methoxymethyl]oxetane (Aron Oxcetane DOX 221, by Toagosei Co., Ltd.), thus preparing an adhesive composition C for a polarizing plate. It was measured that the adhesive composition C had a viscosity of 35 cP and a glass transition temperature of 105° C.

(4) Adhesive Composition D 5 parts by weight of CPI 100P (Sanapro) as a cationic initiator was added to 100 parts by weight of a resin composition which was obtained by adding 25 wt % of bisphenol F epoxy (Kukdo Chemical YDF 170) of which a homopolymer has a glass transition temperature of 135° C., 25 wt % of 1,4-cyclohexane dimethanol diglycidylether of which a homopolymer has a glass transition temperature of 25° C., and 50 wt % of 3-ethyl-3-[(3-ethyloxetane-3-yl) methoxymethyl]oxetane (Aron Oxcetane DOX 221, by Toagosei Co., Ltd.), thus preparing an adhesive composition D for a polarizing plate. It was measured that the adhesive composition D had a viscosity of 45 cP and a glass transition temperature of 85° C.

(5) Adhesive Composition E 5 parts by weight of CPI 100P (Sanapro) as a cationic initiator was added to 100 parts by weight of a resin composition which was obtained by adding 25 wt % of bisphenol A epoxy (SK Cytec) of which a homopolymer has a glass transition temperature of 145° C., 25 wt % of 1,4-cyclohexane dimethanol diglycidylether of which a homopolymer has a glass transition temperature of 25° C., and 50 wt % of 3-ethyl-3-[(3-ethyloxetane-3-yl)methoxymethyl]oxetane (Aron Oxcetane DOX 221, Toagosei Co., Ltd.), thus preparing an adhesive composition E for a polarizing plate. It was measured that the adhesive composition E had a viscosity of 45 cP and a glass transition temperature of 95° C.

(6) Adhesive Composition F 5 parts by weight of CPI 100P (Sanapro) as a cationic initiator was added to 100 parts by weight of a resin composition which was obtained by adding 25 wt % of 3,4-epoxycyclohexylmethyl-3,4'-epoxycyclohexanecarboxylate (Celloxide 2021P by Dicel Chemical Industries, Ltd) of which a homopolymer has a glass transition temperature of 190° C., 25 wt % of 1,4-cyclohexane dimethanol diglycidylether of which a homopolymer has a glass transition temperature of 25° C., 35 wt % of 3-ethyl-3-[(3-ethyloxetane-3-yl) methoxymethyl]oxetane (Aron Oxcetane DOX 221, by Toagosei Co., Ltd.), and 15 wt % of 3-ethyl-3-hydroxymethyl oxetane (Aron Oxcetane OXA, by Toagosei Co., Ltd.), thus preparing an adhesive composition F for a polarizing plate. It was measured that the adhesive composition F prepared as above had a viscosity of 25 cP and a glass transition temperature of 95° C.

(7) Adhesive Composition G 5 parts by weight of CPI 100P (Sanapro) as a cationic initiator, and 5 parts by weight of vinyltriethylsilane were added to 100 parts by weight of a resin composition which was obtained by adding 25 wt % of 3,4-epoxycyclohexylmethyl-3,4'-epoxycyclohexanecarboxylate (Celloxide 2021P by Dicel Chemical Industries, Ltd) of which a homopolymer has a glass transition temperature of 190° C., 25 wt % by 1,4-cyclohexane dimethanol diglycidylether of which a homopolymer has a glass transition temperature of 25° C., and 50 wt % of 3-ethyl-3-[(3-ethyloxetane-3-yl) methoxymethyl]oxetane (Aron Oxcetane DOX 221, by Toagosei Co., Ltd.), thus preparing an adhesive composition G for a polarizing plate. It was measured that the adhesive composition G prepared as above had a viscosity of 29 cP and a glass transition temperature of 105° C.

(8) Adhesive Composition H 5 parts by weight of CPI 100P (Sanapro) as a cationic initiator, and 5 parts by weight of vinyacetate were added to 100 parts by weight of a resin composition which was obtained by adding 25 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 25 wt % of 1,4-cyclohexane dimethanol diglycidylether of which a homopolymer has a glass transition temperature of 25° C., and 50 wt % of 3-ethyl-3-[(3-ethyloxetane-3-yl) methoxymethyl]oxetane (Aron Oxcetane DOX 221, by Toagosei Co., Ltd.), thus preparing an adhesive composition H for a polarizing plate. It was measured that the adhesive composition H prepared as above had a viscosity of 19 cP and a glass transition temperature of 115° C.

(9) Adhesive Composition I 5 parts by weight of CPI 100P (Sanapro) as a cationic initiator was added to 100 parts by weight of a resin composition which was obtained by adding 34 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 17 wt % of 1,4-cyclohexane dimethanol diglycidylether of which a homopolymer has a glass transition temperature of 25° C., and 49 wt % of 3-ethyl-3-[(3-ethyloxetane-3-yl)methoxymethyl]oxetane (Aron Oxcetane DOX 221, by Toagosei Co., Ltd.), thus preparing an adhesive composition I for a polarizing plate. It was measured that the adhesive composition I prepared as above had a viscosity of 43 cP and a glass transition temperature of 118° C.

(10) Adhesive Composition J 5 parts by weight of CPI 100P (Sanapro) as a cationic initiator was added to 100 parts by weight of a resin composition which was obtained by adding 36 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 12 wt % of 1,4-cyclohexane dimethanol diglycidylether of which a homopolymer has a glass transition temperature of 25° C., and 52 wt % of 3-ethyl-3-[(3-ethyloxetane-3-yl)methoxymethyl]oxetane (Aron Oxcetane DOX 221, by Toagosei Co., Ltd.), thus preparing an adhesive composition J for a polarizing plate. It was measured that the adhesive composition J prepared as above had a viscosity of 40 cP and a glass transition temperature of 118° C.

(11) Adhesive Composition K 6 parts by weight of CPI 100P (Sanapro) as a cationic initiator was added to 100 parts by weight of a resin composition which was obtained by adding 22 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 22 wt % of 1,4-cyclohexane dimethanol diglycidylether of which a homopolymer has a glass transition temperature of 25° C., 30 wt % of 3-ethyl-3-[(3-ethyloxetane-3-yl)methoxymethyl]oxetane (Aron Oxcetane DOX 221, by Toagosei Co., Ltd.), and 20 wt % of isobornylacrylate, thus preparing an adhesive composition K for a polarizing plate. It was measured that the adhesive composition K prepared as above had a viscosity of 35 cP and a glass transition temperature of 90° C.

(12) Adhesive Composition L 6 parts by weight of CPI 100P (Sanapro) as a cationic initiator was added to 100 parts by weight of a resin composition which was obtained by adding 22 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 22 wt % of 1,4-cyclohexane dimethanol diglycidylether of which a homopolymer has a glass transition temperature of 25° C., 30 wt % of 3-ethyl-3-[(3-ethyloxetane-3-yl)methoxymethyl]oxetane (Aron Oxcetane DOX 221, by Toagosei Co., Ltd.), and 20 wt % of dipropyleneglycoldiacrylate, thus preparing an adhesive composition L for a polarizing plate. It was measured that the adhesive composition L prepared as above had a viscosity of 35 cP and a glass transition temperature of 95° C.

(13) Adhesive Composition M 5 parts by weight of CPI 100P (Sanapro) as a cationic initiator was added to 100 parts by weight of a resin composition which was obtained by adding 17 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., 44 wt % of 1,4-cyclohexane dimethanol diglycidylether of which a homopolymer has a glass transition temperature of 25° C., and 39 wt % of 3-ethyl-3-[(3-ethyloxetane-3-yl)methoxymethyl]oxetane (Aron Oxcetane DOX 221, by Toagosei Co., Ltd.), thus preparing an adhesive composition M for a polarizing plate. It was measured that the adhesive composition M prepared as above had a viscosity of 35 cP and a glass transition temperature of 70° C.

(14) Adhesive Composition N 5 parts by weight of CPI 100P (Sanapro) as a cationic initiator was added to 100 parts by weight of a resin composition which was obtained by adding 10 wt % of 3,4-epoxycyclohexylmethyl-3,4'-epoxycyclohexanecarboxylate (Celloxide 2021P by Dicel Chemical Industries, Ltd) of which a homopolymer has a glass transition temperature of 190° C., 28 wt % of 1,4-cyclohexane dimethanol diglycidylether of which a homopolymer has a glass transition temperature of 25° C., and 62 wt % of 3-ethyl-3-[(3-ethyloxetane-3-yl)methoxymethyl]oxetane (Aron Oxcetane DOX 221, by Toagosei Co., Ltd.), thus preparing an adhesive composition N for a polarizing plate. It was measured that the adhesive composition N prepared as above had a viscosity of 25 cP and a glass transition temperature of 90° C.

(15) Adhesive Composition O 5 parts by weight of CPI 100P (Sanapro) as a cationic initiator was added to 100 parts by weight of a resin composition which was obtained by adding 50 wt % of 3,4-epoxycyclohexylmethyl-3,4'-epoxycyclohexanecarboxylate (Celloxide 2021P of Dicel Chemical Industries, Ltd) of which a homopolymer has a glass transition temperature of 190° C., and 50 wt % of 3-ethyl-3-[(3-ethyloxetane-3-yl)methoxymethyl]oxetane (Aron Oxcetane DOX 221, Toagosei Co., Ltd.), thus preparing an adhesive composition O for a polarizing plate. It was measured that the adhesive composition O prepared as above had a viscosity of 100 cP and a glass transition temperature of 125° C.

(16) Adhesive Composition P 5 parts by weight of CPI 100P (Sanapro) as a cationic initiator was added to 100 parts by weight of a resin composition which was obtained by adding 50 wt % of 1,4-cyclohexane dimethanol diglycidylether of which a homopolymer has a glass transition temperature of 25° C., and wt % of 3-ethyl-3-[(3-ethyloxetane-3-yl)methoxymethyl]oxetane (Aron Oxcetane DOX 221, Toagosei Co., Ltd.), thus preparing an adhesive composition P for a polarizing plate. It was measured that the adhesive composition P prepared as above had a viscosity of 20 cP and a glass transition temperature of 55° C.

(17) Adhesive Composition Q 5 parts by weight of CPI 100P (Sanapro) as a cationic initiator was added to 100 parts by weight of a resin composition which was obtained by adding 50 wt % of neopentyl glycol diglycidylether of which a homopolymer has a glass transition temperature of 10° C., and 50 wt % of 3-ethyl-3-[(3-ethyloxetane-3-yl)methoxymethyl]oxetane (Aron Oxcetane DOX 221, Toagosei Co., Ltd.), thus preparing an adhesive composition Q for a polarizing plate. It was measured that the adhesive composition Q prepared as above had a viscosity of 15 cP and a glass transition temperature of 45° C.

(18) Adhesive Composition R 3 parts by weight of CGI 819 as a radical initiator, and 3 parts by weight of CPI 100P (Sanapro) as a cationic initiator were added to 100 parts by weight of a resin composition which was prepared by adding 50 wt % of 2-hydroxyethyl acrylate (2-HEA), 25 wt % of phenoxyethyl acrylate (PEA), and 10 wt % of phenol-based novolac epoxy having a molecular weight (Mw) of 50,000 as an epoxy resin, thus preparing an adhesive composition R for a polarizing plate. It was measured that the adhesive composition R prepared as above had a viscosity of 25 cP and a glass transition temperature of 30° C.

(19) Adhesive Composition S 6 parts by weight of CGI 819 as a radical initiator was added to 100 parts by weight of a resin composition which was prepared by adding 50 wt % of 2-hydroxyethyl acrylate (2-HEA), 25 wt % of phenoxyethyl acrylate (PEA), and 25 wt % of isobornyl acrylate (IBOA), thus preparing an adhesive composition S for a polarizing plate It was measured that the adhesive composition S prepared as above had a viscosity of 12 cP and a glass transition temperature of 25° C.

EXAMPLES 1-12

An acrylic film made using Preparation Example 1 was subjected to corona treatment, and one side of the acrylic film was then coated, by using a #7 bar, with a primer composition, in which 10 parts by weight of carbodiimide-based cross-linking agent (carbodinite SV-02 by Nisshinbo Chemical) was added to a primer composition having 10 wt % of a solid component made by diluting CK-PUD-F (Chokwang urethane dispersion) with pure water. Thereafter, the primer composition was elongated at 130° C. in a TD direction by 190% using a tenter to obtain an acrylic film having a primer layer thickness of 400 nm.

Thereafter, after adhesive compositions A to N were coated on both surfaces of a PVA device by using a spoid and the acrylic film was laminated on both surfaces of the PVA device, the thickness condition of a final adhesive layer was set to 1-2 μm and then the PVA device passed through a laminater. Then, ultraviolet (UV) light of 500 mJ/cm² was irradiated onto the laminated surface of the acrylic film using a UV irradiation apparatus (for example, metal halide lamp) to prepare a polarizing plate.

COMPARATIVE EXAMPLE 1 to 8

A polarizing plate was prepared in the same manner as Examples 1 to 12 except that adhesive compositions M to S were used as the adhesive composition.

Delamination, water resistance and thermal impact properties of polarizing plates manufactured by Examples 1 to 12 and Comparative Examples 1 to 8 were measured by the below method, and measured results are shown in Table 1 below.

1. Delamination Force Evaluation of Polarizing plate Delamination force of polarizers and polymer films were measured. A delamination experiment was performed by measuring delamination force when a polarizing plate having a width of 20 nm and a length of 100 mm was delaminated at a rate of 300 mm/min at 90 degrees. The case where the delamination force exceeded 3 N/cm was represented as excellence (EXC), the case where the lamination force was in a range of 1.5 N/cm to 3 N/cm was represented as good, and the case where the delamination force is less than 1.5 N/cm was represented as not good (NG).

2. Evaluation of Water Resistance The polarizing plates were laminated on a glass substrate, and then immersed in a constant temperature bath of 60° C. The water resistance was determined by observing whether an end of the polarizing plate after the elapse of 8 hours was discolored or not. The case in which there was no change was represented as OK, and otherwise as NG.

3. Evaluation of Thermal Impact Property The polarizing plates were laminated on a glass substrate, and then left for 30 minutes at −40° C. Thereafter, the polarizing plates are left for 30 minutes at 80° C. again and this was repeated 100 times. Afterwards, whether the external appearance of the polarizing plate was deformed was estimated with naked eyes. The case where a crack of not more than 2 mm was generated only at an end of the polarizing plate in external appearance was represented as excellence (EXC), the case where only a linear crack of not less than 5 mm was confirmed at a portion other than the end of the polarizing plate was represented as good, and the case where a plurality of cracks were generated in an entire surface of the polarizing plate was represented as not good (NG).

TABLE 1

| Item | Adhesive | Delamination | Water Resistance | Thermal Impact Property |
|---|---|---|---|---|
| Example 1 | A | EXC | OK | EXC |
| Example 2 | B | EXC | OK | EXC |
| Example 3 | C | GOOD | OK | GOOD |
| Example 4 | D | GOOD | OK | GOOD |
| Example 5 | E | GOOD | OK | GOOD |
| Example 6 | F | EXC | OK | EXC |
| Example 7 | G | EXC | OK | EXC |
| Example 8 | H | EXC | OK | EXC |
| Example 9 | I | EXC | OK | EXC |
| Example 10 | J | EXC | OK | EXC |
| Example 11 | K | EXC | OK | GOOD |
| Example 12 | L | EXC | OK | GOOD |
| Comp. EX. 1 | M | EXC | OK | NG |
| Comp. EX. 2 | N | NG | OK | GOOD |
| Comp. EX. 3 | O | NG | OK | EXC |
| Comp. EX. 4 | P | EXC | OK | NG |
| Comp. EX. 5 | Q | EXC | OK | NG |
| Comp. EX. 6 | R | NG | OK | NG |
| Comp. EX. 7 | S | NG | NG | NG |

EXAMPLES 13 to 16

—Preparation of Acrylic Film (a)

An acrylic film made by using Preparation Example 1(1) was subjected to corona treatment, and one side of the acrylic film was then coated, by using a #7 bar, with a primer composition, in which 5 parts by weight of carbodiimide-based cross-linking agent (carbodinite SV-02 by Nisshinbo Chemical) was added to a primer composition having 10 wt % of a solid component which was made by diluting CK-PUD-F (Chokwang urethane dispersion) with pure water. Thereafter, the primer composition was elongated at 130° C. in a TD direction by 190% using a tenter to obtain an acrylic film (a) having a primer layer thickness of 400 nm.

—Preparation of Acrylic Film (b)

An acrylic film made by using Preparation Example 1(1) was subjected to corona treatment, and one side of the acrylic film was then coated, by using a #7 bar, with a primer composition, in which 10 parts by weight of carbodiimide-based cross-linking agent (carbodinite SV-02 by Nisshinbo Chemical) was added to a primer composition having 10 wt % of a solid component which was made by diluting CK-PUD-F (Chokwang urethane dispersion) with pure water. Thereafter, the primer composition was elongated at 130° C. in a TD direction by 190% using a tenter to obtain an acrylic film (b) having a primer layer thickness of 400 nm.

Thereafter, after adhesive compositions A, F, G, and K were coated on both surfaces of a PVA device by using a spoid and the acrylic films (a) and (b) were laminated on both surfaces of the PVA device, the thickness condition of a final adhesive layer was set to 1-2 μm and then the PVA device passed through a laminator (5 m/min). Then, ultraviolet (UV) light of 500 mJ/cm$^2$ was irradiated onto the laminated surface of the acrylic film (a) using a UV irradiation apparatus (for example, a metal halide lamp) to prepare a polarizing plate.

Delamination, water resistance and thermal impact properties of polarizing plates manufactured by Examples 13 to 16 were measured by the same method as the above method, and measured results are shown in Table 2 below.

TABLE 2

| Item | Adhesive | Delamination | Water Resistance | Thermal Impact Property |
|---|---|---|---|---|
| Example 13 | A | EXC | OK | EXC |
| Example 14 | F | EXC | OK | EXC |
| Example 15 | G | EXC | OK | EXC |
| Example 16 | K | EXC | OK | EXC |

EXAMPLES 17 to 19

An acrylic film made by using Preparation Example 1 was subjected to a corona treatment, and one side of the acrylic film was then coated, by using a #6 bar, with a primer composition, in which 20 parts by weight of oxazoline cross-linking agent (WS700 by Nippon Shokubai Co., Ltd.) was added to a primer composition having 10 wt % of a solid component which was made by diluting CK-PUD-F (Chokwang urethane dispersion) with pure water. Thereafter, the primer composition was elongated at 130° C. in a TD direction by 190% using a tenter to obtain an acrylic film having a primer layer thickness of 400 nm.

Thereafter, after adhesive compositions A, F, and K were coated on both surfaces of a PVA device by using a spoid and the acrylic film was laminated on both surfaces of the PVA device, the thickness condition of a final adhesive layer was set to 1-2 μm and then the PVA device passed through a laminater. Then, ultraviolet (UV) light of 500 mJ/cm$^2$ was irradiated onto the laminated surface of the acrylic film using a UV irradiation apparatus (for example, a metal halide lamp) to prepare a polarizing plate.

Delamination, water resistance and thermal impact properties of polarizing plates manufactured by Examples 17 to 19 were measured by the same method as the above method, and measured results are shown in Table 3 below.

TABLE 3

| Item | Adhesive | Delamination | Water Resistance | Thermal Impact Properties |
|---|---|---|---|---|
| Example 17 | A | EXC | OK | EXC |
| Example 18 | F | EXC | OK | EXC |
| Example 19 | K | EXC | OK | EXC |

The invention claimed is:

1. An adhesive composition for a polarizing plate comprising:

a first epoxy monomer having a glass transition temperature of a homopolymer of 135° C. to 190° C. and a second epoxy monomer having a glass transition temperature of a homopolymer of 10° C. to 45° C., 0.5 parts by weight to 20 parts by weight of a cationic photopolymerization initiator based on 100 parts by weight of the first epoxy monomer, and 100 parts by weight to 250 parts by weight of oxetane compound having at least one oxetanyl group in a molecule with respect to 100 parts by weight of the first epoxy monomer, wherein a weight ratio of the first epoxy monomer to the second epoxy monomer is 1:1 to 3:1, wherein the first epoxy monomer is at least one selected from the group consisting of 3,4-epoxycyclohexylmethyl-3,4'-epoxycyclohexanecarboxylate and vinylcyclohexenedioxide, wherein the second epoxy monomer is at least one selected from the group consisting of 1,4-cyclohexanedimethanol diglycidyl ether, 1,4-butanediol diglycidyl ether, neopentyl diglycidyl ether and trimethylolpropane triglycidyl ether, and wherein after curing a glass transition temperature of the adhesive composition is ranging from 80° C. to 120° C., and a viscosity of the adhesive composition is ranging from 10 to 50 cP at 25° C.

2. The adhesive composition of claim 1, further comprising a vinyl compound, which is contained at a weight ratio of 0.1 parts by weight to 10 parts by weight with respect to 100 parts by weight of the overall adhesive composition.

3. The adhesive composition of claim 2, wherein the vinyl compound is one selected from the group consisting of hydroxy-$C_{1-6}$ alkyl vinyl ether and vinyl acetate.

4. The adhesive composition of claim 1, further comprising a silane coupling agent, which is contained at a weight ratio of 0.1 parts by weight to 5 parts by weight with respect to 100 parts by weight of the overall adhesive composition.

5. The adhesive composition of claim 4, wherein the silane coupling agent comprises at least one cationic polymerization functional group selected from the group consisting of epoxy groups, vinyl groups, and radical groups.

6. The adhesive composition of claim 1, further comprising a radical polymerization monomer, which is contained at a weight ratio of 0-40 parts by weight with respect to 100 parts by weight of the overall adhesive composition.

7. The adhesive composition of claim 6, further comprising a photo-radical polymerization initiator, which is contained at a weight ratio of 0.5-20 parts by weight with respect to 100 parts by weight of the overall adhesive composition.

8. A polarizing plate comprising a polarizer, an adhesive layer formed on at least one surface of the polarizer, and a transparent base film formed on the adhesive layer, wherein the adhesive layer is formed of the adhesive composition of claim 1.

9. The polarizing plate of claim 8, further comprising a primer layer between the adhesive layer and the transparent base film.

10. The polarizing plate of claim 9, wherein the primer layer is formed of a primer composition comprising 1-50 parts by weight with respect to 100 parts by weight of the primer composition of a urethane polymer, 0.1-10 parts by weight with respect to 100 parts by weight of the primer composition of water-dispersible fine particles, and a balance of water.

11. An optical device comprising the polarizing plate of claim 8.

12. The polarizing plate of claim 8, wherein the transparent base film is at least one selected from the group consisting of an acrylic film, a PET (polyethyleneterephthalate) film, an acrylic-based primer-treated PET (polyethyleneterephthalate) film, a polynorbornene film, a COP (cycloolefinpolymer) film, a polycarbonate film and TAC (triacetylcellulose) film.

* * * * *